United States Patent
Lim et al.

(10) Patent No.: US 12,341,202 B2
(45) Date of Patent: Jun. 24, 2025

(54) POUCH TYPE SECONDARY BATTERY, BATTERY PACK, AND METHOD FOR MANUFACTURING POUCH TYPE SECONDARY BATTERY

(71) Applicant: LG Energy Solution, Ltd., Seoul (KR)

(72) Inventors: Seong Yoon Lim, Daejeon (KR); Han Kil Kim, Daejeon (KR); Hey Woong Park, Daejeon (KR); Jeong Wan Yoo, Daejeon (KR); Woo Sup Kim, Daejeon (KR); Jae Hong Shim, Deajeon (KR); Seung Ho Na, Daejeon (KR); Sung Won Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 521 days.

(21) Appl. No.: 17/776,431

(22) PCT Filed: Dec. 3, 2020

(86) PCT No.: PCT/KR2020/017534
§ 371 (c)(1),
(2) Date: May 12, 2022

(87) PCT Pub. No.: WO2021/112582
PCT Pub. Date: Jun. 10, 2021

(65) Prior Publication Data
US 2022/0407152 A1 Dec. 22, 2022

(30) Foreign Application Priority Data

Dec. 3, 2019 (KR) .......... 10-2019-0159032
Dec. 3, 2020 (KR) .......... 10-2020-0167153

(51) Int. Cl.
*H01M 50/105* (2021.01)
*H01M 10/04* (2006.01)
(Continued)

(52) U.S. Cl.
CPC ....... *H01M 50/105* (2021.01); *H01M 10/049* (2013.01); *H01M 50/178* (2021.01);
(Continued)

(58) Field of Classification Search
CPC ............. H01M 10/049; H01M 50/105; H01M 50/178; H01M 50/184; H01M 50/186; H01M 50/46; H01M 50/56; Y02E 60/10
See application file for complete search history.

(56) References Cited

U.S. PATENT DOCUMENTS

2014/0272488 A1 9/2014 Kim et al.
2015/0155530 A1 6/2015 Takahashi et al.
(Continued)

FOREIGN PATENT DOCUMENTS

CN 110114898 A 8/2019
CN 110199405 A 9/2019
(Continued)

OTHER PUBLICATIONS

International Search Report for PCT/KR2020/017534 dated Mar. 12, 2021. 3 pgs.
(Continued)

*Primary Examiner* — Victoria H Lynch
(74) *Attorney, Agent, or Firm* — Lerner David LLP

(57) ABSTRACT

Disclosed are a pouch type secondary battery, a battery pack, and a method for manufacturing the pouch type secondary battery. According to one aspect of the present invention, in an exterior accommodating an electrode assembly, a sealing part is formed along a circumference of the electrode assembly. The sealing part includes a first sealing part formed to cover an electrode lead, and one end of the first sealing part is formed below an upper end of a circumference of a cup formed in the pouch.

16 Claims, 8 Drawing Sheets

(51) Int. Cl.
*H01M 50/178* (2021.01)
*H01M 50/186* (2021.01)
*H01M 50/46* (2021.01)
*H01M 50/56* (2021.01)

(52) U.S. Cl.
CPC ......... *H01M 50/186* (2021.01); *H01M 50/46* (2021.01); *H01M 50/56* (2021.01)

(56) References Cited

U.S. PATENT DOCUMENTS

| | | |
|---|---|---|
| 2016/0315294 A1 | 10/2016 | Kim |
| 2019/0237711 A1 | 8/2019 | Takahashi et al. |
| 2019/0237832 A1 | 8/2019 | Ju et al. |
| 2019/0305260 A1 | 10/2019 | Kim et al. |
| 2019/0393455 A1 | 12/2019 | Seo et al. |
| 2020/0185675 A1 | 6/2020 | Lee et al. |
| 2022/0158272 A1 | 5/2022 | Ju et al. |
| 2022/0158276 A1 | 5/2022 | Kim et al. |
| 2022/0311090 A1 | 9/2022 | Lee et al. |

FOREIGN PATENT DOCUMENTS

| | | |
|---|---|---|
| JP | 2001084970 A | 3/2001 |
| JP | 2008052932 A | 3/2008 |
| JP | 2010205420 A | 9/2010 |
| JP | 2010244865 A | 10/2010 |
| JP | 2011113929 A | 6/2011 |
| JP | 2012064459 A | 3/2012 |
| JP | 201544583 A | 3/2015 |
| JP | 2016539478 A | 12/2016 |
| KR | 101104150 B1 | 1/2012 |
| KR | 101294259 B1 | 8/2013 |
| KR | 20140064406 A | 5/2014 |
| KR | 20160100602 A | 8/2016 |
| KR | 101802296 B1 | 11/2017 |
| KR | 20170132565 A | 12/2017 |
| KR | 20180085185 A | 7/2018 |
| KR | 20180107461 A | 10/2018 |
| KR | 20190042800 A | 4/2019 |
| WO | 2019045329 A1 | 3/2019 |
| WO | 2019078453 A1 | 4/2019 |

OTHER PUBLICATIONS

Extended European Search Report for Application No. 20895835.5 dated Nov. 3, 2022. 11 pgs.

--Prior Art--

POUCH TYPE SECONDARY BATTERY, BATTERY PACK, AND METHOD FOR MANUFACTURING POUCH TYPE SECONDARY BATTERY

CROSS-REFERENCE TO RELATED APPLICATIONS

The present application is a national phase entry under 35 U.S.C. § 371 of International Application No. PCT/KR2020/017534, filed on Dec. 3, 2020, published in Korean, which claims priority to Korean Patent Application Nos. 10-2019-0159032, filed on Dec. 3, 2019, and 10-2020-0167153, filed on Dec. 3, 2020, the disclosures of which are hereby incorporated by reference herein in their entireties.

TECHNICAL FIELD

The present invention relates to a pouch type secondary battery, a battery pack, and a method for manufacturing the pouch type secondary battery.

BACKGROUND ART

Secondary batteries that are repetitively chargeable and dischargeable may be divided into cylindrical type secondary batteries, prismatic type secondary batteries, and pouch type secondary batteries according to their structures and manufacturing methods. Among them, such a pouch type secondary battery is manufactured by accommodating an electrode assembly in a pouch type sheet and then sealing the sheet. When compared to other types of secondary batteries, the pouch type secondary battery has a simple structure and high capacity per unit volume and thus is widely used in vehicle batteries or energy storage devices.

In more detail, in the pouch type secondary battery, after forming a cup in a shape that is recessed in the pouch type sheet, the electrode assembly is accommodated in the cup, and the pouch type sheet is folded so that one area of the pouch type sheet covers the electrode assembly. Then, a sealing part that seals a circumference of the electrode is formed to manufacture the pouch type secondary battery.

The pouch type secondary battery is provided with a protruding electrode lead so as to be electrically connected to an external component. Here, the sealing part is formed to cover the electrode lead. However, according to the related art, there is a problem that cracks occur around the electrode lead.

FIG. 1 is a plan view illustrating a structure of a pouch type secondary battery according to the related art.

Referring to FIG. 1, in a secondary battery 1 according to the related art, an electrode assembly 20 is accommodated in a pouch 30, and a sealing part 30a is formed around the electrode assembly 20.

An area of a circumference of the electrode assembly 20, on which the sealing part 30a is not formed, forms a folding part F at which a sheet constituting the pouch 30 is folded. According to the related art, since the sealing part is not formed on the folding part F, the sheet constituting the pouch is not bonded to the folding part F, but is in contact with the folding part F.

However, since the sheet constituting the pouch is not boned to the folding part F, when the sealing part 30a is bent, stress is concentrated to an area of the folding part F, which is adjacent to the sealing part 30a, to cause damage such as cracks in the pouch forming the folding part F.

Particularly, this problem frequently occurs in the vicinity (see reference symbol A of FIG. 1) of the sealing part forming to cover electrode leads 20a and 20b at the folding part F. For example, in the case of a battery module or a battery pack, a plurality of pouch type secondary batteries are stacked, and the electrode leads extending outward from the pouch type secondary batteries are collected to be welded so as to form a bundle of the electrode leads. As a result, the bundle of the electrode lead may be formed, and the group of the plurality of secondary batteries may be assembled to manufacture the battery module or the battery pack. However, in the assembly process, the electrode lead may be bent upward or downward with respect to a thickness direction of the secondary battery. In this case, force may be concentrated to a portion of the folding part F in the vicinity (see reference symbol A of FIG. 1) of the sealing part formed to cover the electrode leads 20a and 20b, and thus, a phenomenon, in which the sealing part is sharply folded, may occur. As a result, if the sealing part is bent over a predetermined angle, there is a problem in that the stress is concentrated to cause pouch cracks (including internal aluminum cracks).

DISCLOSURE OF THE INVENTION

Technical Problem

Therefore, an object of the present invention for solving the above problems is to solve the problem in which a pouch is damaged or cracked in an area of a folding part F, which is adjacent to a sealing part covering an electrode lead.

Technical Solution

According to a first aspect of the present invention for achieving the above object, provided is a pouch type secondary battery including: an electrode assembly having a structure, in which electrodes and a separator are alternately disposed; a pouch type exterior in which a cup (P) having a shape recessed to accommodate the electrode assembly is formed; and an electrode lead electrically connected to the electrode assembly and protruding outward through a circumference of the exterior, wherein a sealing part is formed on the exterior along the circumference of the electrode assembly, the electrode lead includes a first electrode lead protruding outward through an upper circumference of the exterior, the sealing part includes a first sealing part formed to cover the first electrode lead, and one end of the first sealing part is formed below an upper end of a circumference of the cup (P).

A left end and a right end of the first sealing part may be formed below the upper end of the circumference of the cup (P).

The electrode lead may include a second electrode lead protruding outward through a lower circumference of the exterior, the sealing part may include a second sealing part formed to cover the second electrode lead, and one end of the second sealing part may be formed above a lower end of the circumference of the cup (P).

A left end and a right end of the second sealing part may be formed above the lower end of the circumference of the cup (P).

An area of the first sealing part, which is formed by being sealed below the upper end (TE) of the circumference of the cup (P), may have a length (d) of more than 0 mm and not more than less than 10 mm.

An inner circumference of an area of the first sealing part, which is provided below the upper end of the circumference of the cup (P) may have a straight-line shape.

An inner circumference of an area of the first sealing part, which is provided below the upper end of the circumference of the cup (P) may have a curved shape.

An inner circumference of an area of the first sealing part, which is provided below the upper end of the circumference of the cup (P) may have both straight-line and curved shapes.

The curved shape may be formed to be concave when viewed from the electrode assembly.

The curved shape may be formed to be convex when viewed from the electrode assembly.

The pouch type exterior may include a first area and a second area, a folding part may be formed on the first area and the second area so that when the first area is folded with respect to the second area, the first area and the second area face each other, one end of a left end and a right end of the first sealing part, which is provided to be adjacent to the folding part, may be formed below the upper end of the circumference of the cup (P), and one end of a left end and a right end of the second sealing part, which is provided to be adjacent to the folding part, may be formed above the lower end of the circumference of the cup (P).

The sealing part may further include a third sealing part formed to connect the first sealing part to the second sealing part.

One end of the first sealing part may be formed below an upper end of the circumference of the electrode assembly.

One end of the second sealing part may be formed above a lower end of the circumference of the electrode assembly.

The third sealing part may be bent in a direction of a thickness (t) of the electrode assembly.

According to a second aspect of the present invention for achieving the above object, a battery pack including the secondary battery is provided.

According to a second aspect of the present invention for achieving the above object, a provided is a method for manufacturing a pouch type secondary battery, the method including: a step of preparing an electrode assembly having a structure, in which electrodes and a separator are alternately disposed, and a pouch type exterior, in which a cup (P) having a recessed shape is formed; a step of accommodating the electrode assembly in the cup; a step of folding the exterior so that one area and the other area of the exterior face each other; a step of disposing a first electrode lead protruding outward through an upper circumference of the exterior and a second electrode lead protruding outward through a lower circumference of the exterior; a step of forming a first sealing part on the exterior to cove the first electrode lead; and a step of forming a second sealing part on the exterior to cover the second electrode lead, wherein, in the step of forming the first sealing part, one end of the first sealing part is sealed to be formed below an upper end of a circumference of the cup (P).

In the step of forming the second sealing part, one end of the second sealing part may be sealed to be formed above a lower end of the circumference of the cup (P).

The step of forming the first sealing part may include a two-stage sealing process comprising a normal lead sealing process and an additional sealing process.

The normal lead sealing process may be a process of sealing an area of the sealing part, which is disposed above the upper end of the circumference of the cup, through a sealing tool so that a first area and a second area of the pouch cover the first electrode lead to form a normal lead sealing area (S1), and the additional lead sealing process may be a process of sealing an area of the sealing part, which is disposed below the upper end of the circumference of the cup through the sealing tool so that the first area and the second area of the pouch are bonded to each other to form an additional sealing area (S2).

In the step of forming the first sealing part, each of the normal lead sealing area (S1) and the additional sealing area (S2) may have different sealing thicknesses for each section.

The method may further include a step of forming a third sealing part formed along the circumference of the electrode assembly to connect the first sealing part to the second sealing part.

Advantageous Effects

According to the present invention, the problem in which the pouch is damaged or cracked in the area of the folding part F, which is adjacent to the sealing part covering an electrode lead, may be solved.

MODE FOR CARRYING OUT THE INVENTION

Hereinafter, a pouch type secondary battery, a battery pack, and a method for manufacturing the pouch type secondary battery according to the present invention will be described with reference to the drawings.

Pouch Type Secondary Battery and Battery Pack

Figure 2:
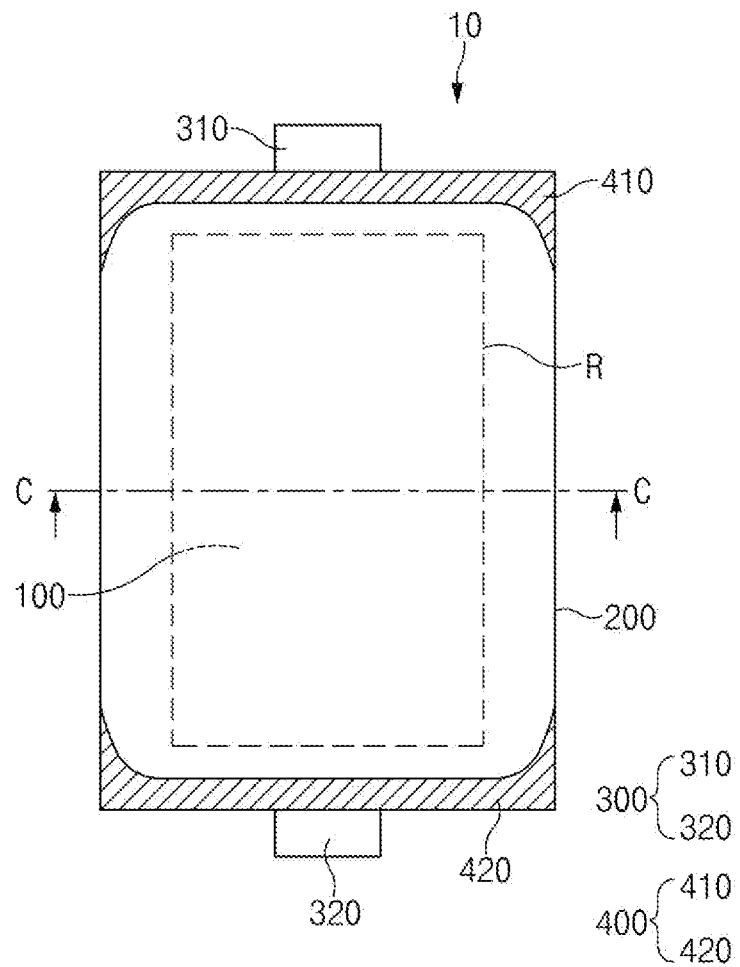
FIG. 2 is a plan view illustrating a state in which a first sealing part and a second sealing part are formed in a pouch type secondary battery according to the present invention.
Figure 3:
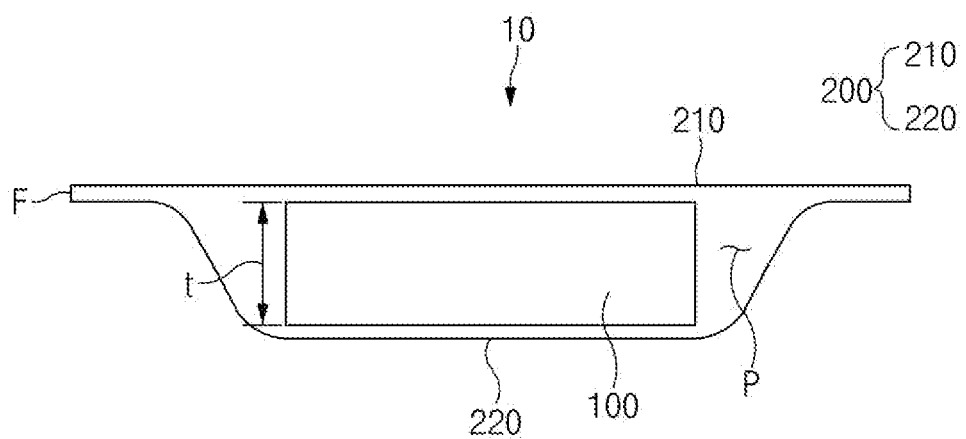
FIG. 3 is a vertical cross-sectional view illustrating the pouch type secondary battery when taken along line C-C of FIG. 2.
Figure 4:
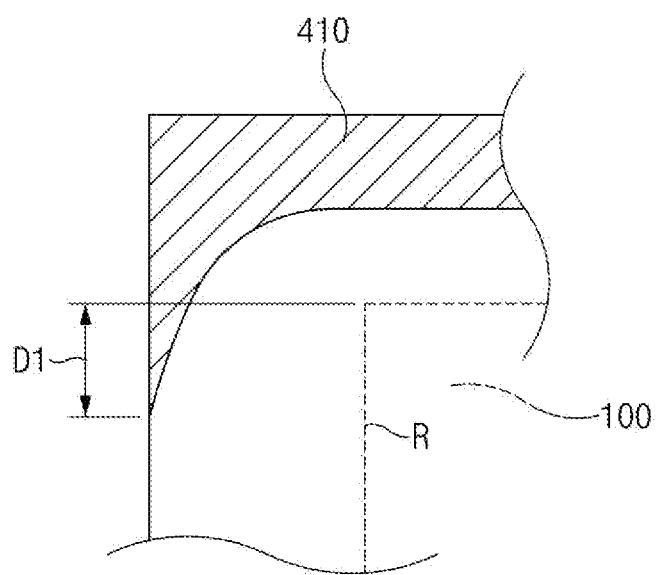
FIG. 4 is an enlarged view illustrating a configuration of a first sealing part of a pouch type secondary battery according to a first embodiment of the present invention.
Figure 5:
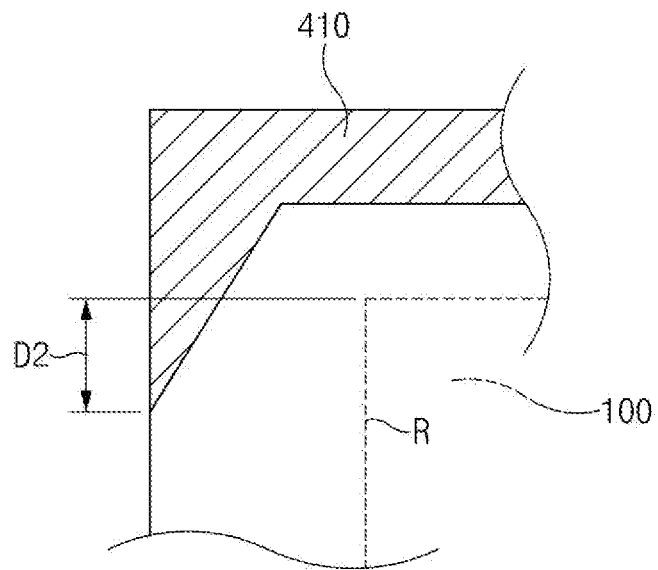
FIG. 5 is an enlarged view illustrating a configuration a first sealing part of a pouch type secondary battery according to a second embodiment of the present invention.
Figure 6:
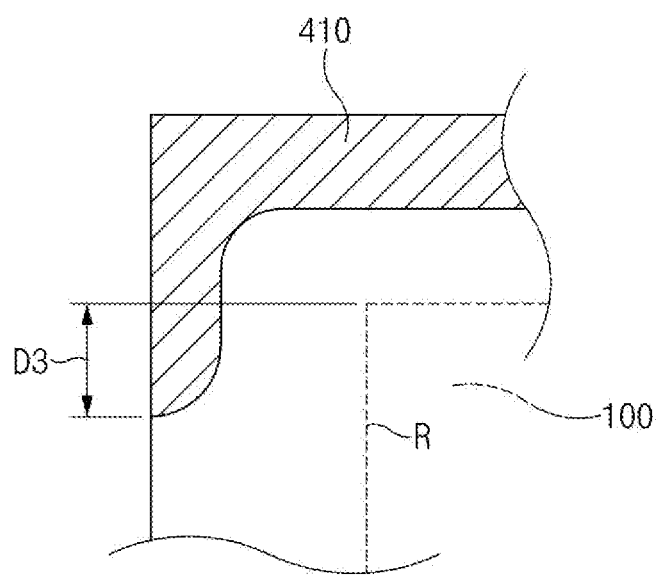
FIG. 6 is an enlarged view illustrating a configuration of a first sealing part of a pouch type secondary battery according to a third embodiment of the present invention.

FIG. 2 is a plan view illustrating a state in which a first sealing part and a second sealing part are formed in a pouch type secondary battery according to the present invention, and FIG. 3 is a vertical cross-sectional view illustrating the pouch type secondary battery when taken along line C-C of FIG. 2. FIG. 4 is an enlarged view illustrating a configuration of a first sealing part of a pouch type secondary battery according to a first embodiment of the present invention, FIG. 5 is an enlarged view illustrating a configuration a first sealing part of a pouch type secondary battery according to a second embodiment of the present invention, and FIG. 6 is an enlarged view illustrating a configuration of a first sealing part of a pouch type secondary battery according to a third embodiment of the present invention. Also, FIG. 7 is a plan view illustrating a state in which the first sealing part and the second sealing part are formed in the pouch type secondary battery according to the present invention.

Figure 7:
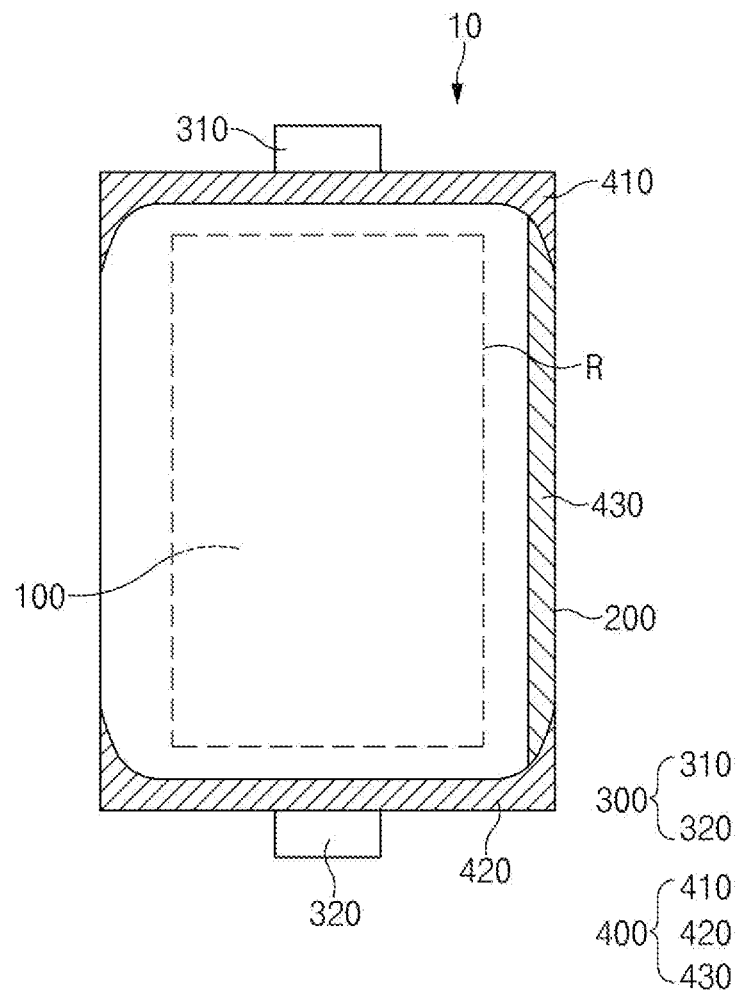
FIG. 7 is a plan view illustrating a state in which the first sealing part and the second sealing part are formed in the pouch type secondary battery according to the present invention.

As illustrated in FIGS. 2, 3, and 7, a pouch type secondary battery 10 (hereinafter, referred to as a 'secondary battery') according to the present invention may include an electrode assembly 100 having a structure, in which electrodes and a separator are alternately disposed, and a pouch type exterior 200 (hereinafter, referred to as an 'exterior') in which a cup P having a shape recessed to accommodate the electrode assembly 100 is formed.

As illustrated in FIG. 3, the exterior 200 may include a first area 210 and a second area 220. Here, in the exterior 200, a folding part formed on a boundary between the first area 210 and the second area 220 so that the first area 210 and the second area 220 face each other when the second area 220 is folded with respect to the first area 210. This may be considered that the first area 210 is folded with respect to the second area 220 at the folding part F. Although FIG. 3 illustrates a state in which the cup P is formed in the second area 220 provided at a lower side in the exterior 200, unlike this, the cup P may be formed in the first area 210 provided at an upper side, or the cup P may be formed in both the first area 210 and the second area 220. In FIG. 2, the boundary R that is a circumference of the cup P formed in the exterior 200 is illustrated by a dotted line.

Subsequently, referring to FIGS. 2 and 7, the secondary battery 10 according to the present invention further includes electrode leads 310 and 320 which are electrically connected to the electrode assembly 100 and protrude outward through the circumference of the exterior 200.

Here, the electrode leads 310 and 320 may include a first electrode lead 310 protruding outward through an upper circumference of the exterior 200 and a second electrode lead 320 protruding outward through a lower circumference of the exterior 200 and having a polarity different from that of the first electrode lead. That is, in the secondary battery 10 according to the present invention, the first electrode lead 310 and the second electrode lead 320 may protrude in opposite directions (that the first electrode lead and the second electrode lead protrude in the opposite directions are merely one embodiment of the present invention, and thus, the present invention is not limited thereto, and a case in which the first electrode lead and the second electrode lead protrude in the same direction may be applied to the technical idea of the present invention).

Referring to FIGS. 2 and 7, a sealing part 400 may be formed on the exterior 200 along a circumference of the electrode assembly 100. The sealing part 400 may be formed by bonding the first area 210 and the second area 220 of the exterior 200 to each other. Here, the sealing part 400 may be formed on an area of the exterior 200 surrounding the circumference of the electrode assembly 100 except for the area on which the folding part F is formed.

The sealing part 400 may include a first sealing part 410 formed to cover the first electrode lead 310, a second sealing part 420 formed to cover the second electrode lead 320, and a third sealing part 430 formed to connect the first sealing part 410 to the second sealing part 420. Referring to FIG. 7, an upper end of the third sealing part 430 may be connected to the first sealing part 410, and a lower end of the third sealing part 430 may be connected to the second sealing part 420. Also, the third sealing part 430 may be formed to face the folding part F with the electrode assembly 100 or the cup P therebetween. Also, as will be described later, the third sealing part 430 may be formed later in time than the first sealing part 410 and the second sealing part 420 (however, the present invention is not limited thereto, and if one sealing tool is used as necessary, the third sealing part 430, the first sealing part 410, and the second sealing part 420 may be formed at the same time).

One end of the first sealing part 410 of the pouch type secondary battery 10 according to the present invention or one end of the second sealing part 420 may be formed to face the folding part F. Referring to FIGS. 2 and 7, one end of the first sealing part 410 according to the present invention may be formed below an upper end of a circumference of the cup P of the exterior 200, and one end of the second sealing part 420 may be formed above a lower end of the circumference of the cup P of the exterior 200.

Here, according to an embodiment of the present invention, as illustrated in FIGS. 2 and 7, both a left end and a right end of the first sealing part 410 may be formed below the upper end of the circumference of the cup P, and both a left end and a right end of the second sealing part 420 may be formed above the lower end of the circumference of the cup P.

However, unlike this, according to another embodiment of the present invention, only one end (i.e., only the left end in FIG. 7) of the left end and right end of the first sealing part 410, which is provided adjacent to the folding part F may be formed below the upper end of the circumference of the cup P, and only one end (i.e., only the left end in FIG. 7) of the left end and the right end of the second sealing part 420, which is provided adjacent to the folding part F may be formed above the lower end of the circumference of the cup P.

As described in the method for manufacturing the pouch type secondary battery to be described later, the process of forming the first sealing part 410 may be, more particularly, a process of performing sealing in two stages. The two-stage sealing may mean a normal lead sealing process and an additional sealing process.

Figure 8:
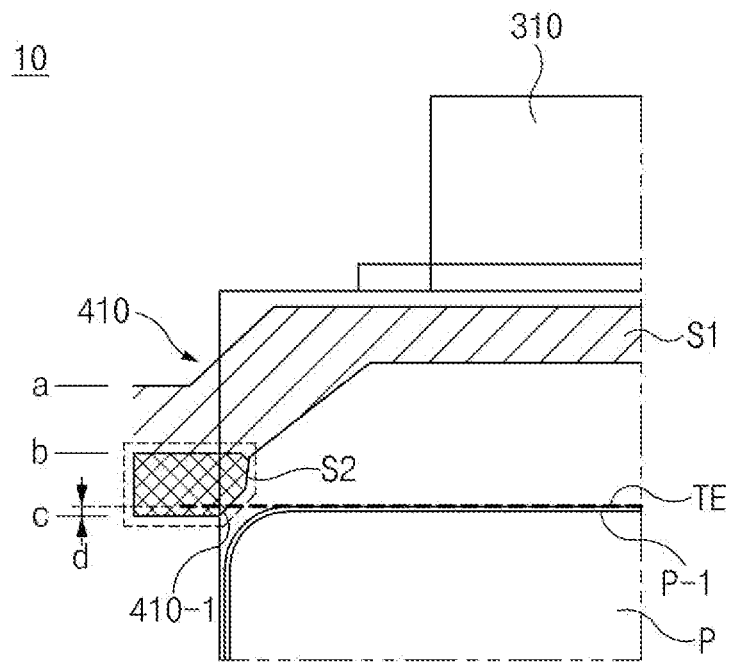
FIG. 8 is a plan view illustrating a state in which the first sealing part is formed through a normal lead sealing process and an additional sealing process.

FIG. 8 is a plan view illustrating a state in which the first sealing part 410 is formed through a normal lead sealing process and an additional sealing process.

A normal lead sealing area S1 may be formed through the normal lead sealing process, and an additional sealing area S2 may be formed through the additional sealing process. Referring to FIG. 8, a shape of the first sealing part 410 may be described in more detail.

In the pouch type secondary battery according to the present invention, one end 410-1 of the first sealing part may be formed below an upper end TE of a circumference P-1 of the cup of the exterior. In FIG. 8, the circumference P-1 and the upper end TE of the cup are illustrated in detail. The circumference P-1 of the cup may mean a circumferential portion of the cup having an internal accommodation space into which the electrode assembly is inserted. Particularly, the circumference P-1 of the cup may mean an upper circumference of the cup, not a circumference of a bottom portion of the cup. Here, the upper portion may mean an upper portion based on a thickness direction of the secondary battery 10.

Also, as illustrated in FIG. 8, the circumference P-1 of the cup may have a predetermined thickness. In the pouch type secondary battery 10 according to the present invention, the upper end TE of the circumference P-1 of the cup may mean an outer line of outer and inner lines forming a thickness of the circumference P-1 of the cup. In FIG. 8, the circumference P-1 of the cup is indicated by a solid line, and the upper end TE is indicated by a dotted line. In this manner, one end 410-1 of the first sealing part may be formed below the upper end TE of the circumference P-1 of the cup of the exterior, and as an effect, it is possible to prevent pouch cracks from occurring.

Referring to FIG. 8, in the pouch type secondary battery according to the present invention, an area of the first sealing part 410, which is formed by being sealed below the upper end TE of the circumference P-1 of the cup through the additional sealing process, may have a length d of 0 mm to 10 mm. The meaning of 0 mm to 10 mm may mean more than 0 mm and not more than less than 10 mm. If the length d is 0 mm, an effect of the present invention of preventing the cracks from occurring in the pouch near the sealing part may not be effectively expressed. If the length d exceeds 10 mm, the additionally sealed portion may be inserted too deeply toward the electrode assembly so that the space in which the electrode assembly is accommodated is narrow or tight.

Also, each of the normal lead sealing area S1 and the additional sealing area S2 may have different sealing thicknesses for each section. For example, the sealing thickness may be different in a section a-b and a section b-c of FIG. 8. The section a-b may represent a general pouch-pouch sealing thickness (reference sealing thickness), and the section b-c may have a thickness greater or less than that of the section a-b. Also, the sealing thickness may be constant or variable even within one section. That is, the sealing thickness may be constant within one section a-b, but the present invention is not limited thereto, and the sealing thickness may constantly increase or decrease in the section a-b. Furthermore, the sealing thickness may be irregularly changed even within one section. Also, the above description may be applied even within one section b-c.

When the sealing form is implemented in such various forms, an optimal sealing part for preventing the pouch cracks from occurring may be configured in accordance with a case in which a size, shape, type, material, thickness, etc. of the pouch vary. As a result, an excellent secondary battery in which the prevention of occurrence of the pouch cracks, which is an inherent effect of the present invention, is maximized for each pouch type may be manufactured.

According to the present invention, one end of the first sealing part 410 that covers the first electrode lead 310 and the second electrode lead 320 may be formed to extend toward the folding part F so that the one end is lower than the upper end of the circumference of the cup P when compared to the related art or may be formed to extend toward the folding part F so that the one end is higher than the lower end of the circumference of the cup P when compared to the related art to prevent the cracks from occurring in the folding part or the vicinity of the folding part due to the concentration of the stress.

Figure 1:
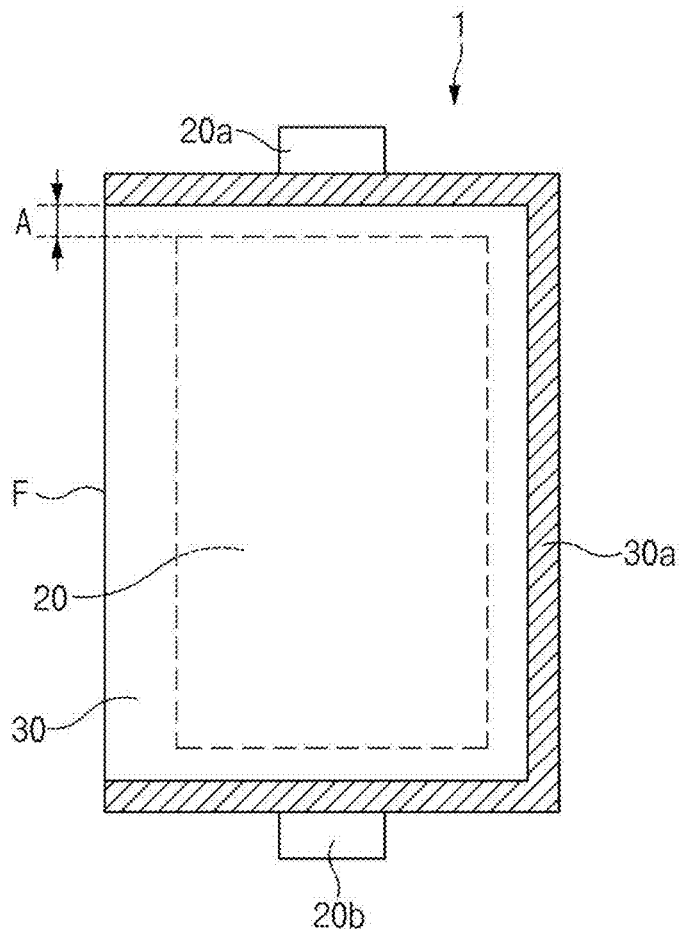
FIG. 1 is a plan view illustrating a structure of a pouch type secondary battery according to the related art.

Particularly, according to the present invention, since an end of the ends of the first sealing part and the second sealing part, which is provided to be adjacent to the folding part, extends downward or upward toward the folding part, the occurrence of the cracks may be prevented even the area (see reference symbol A of FIG. 1) on which the cracks frequently occur when the pouch type secondary battery is manufactured according to the related art.

For example, in the process of assembling the group of the plurality of secondary batteries to manufacture the battery module and the battery pack, the electrode lead may be bent upward or downward with respect to the thickness direction of the secondary battery. In this case, since the folding part F that is in the vicinity (see reference symbol A of FIG. 1) of the sealing part formed to cover the electrode leads 20a and 20b is sealed in the present invention, a phenomenon, in which the folding part F is sharply folded, may not occur to prevent the pouch cracks from occurring due to the concentration of the stress. That is, if the lead is not sealed, the lead is bent upward or downward with respect to the thickness direction of the secondary battery, a portion A of the pouch may be sharply folded. However, if the lead is sealed, even though the lead is bent, the portion A of the sealing part of the pouch may be only curved (i.e., bent), but may not sharply folded.

As illustrated in FIG. 4, according to the first embodiment of the present invention, an inner circumference of an area (i.e., an area existing within a section D1 of FIG. 4) of the first sealing part 410, which is provided below the upper end of the circumference of the cup P, may be formed in a curved shape. Also, according to the first embodiment of the present invention, an inner circumference of an area of the second sealing part 420, which is provided above the lower end of the circumference of the cup P, may also be formed in a curved shape.

On the other hand, as illustrated in FIG. 5, according to the second embodiment of the present invention, an inner circumference of an area (i.e., an area existing within a section D2 of FIG. 5) of the first sealing part 410, which is provided below the upper end of the circumference of the cup P, may be formed in a straight-line shape. Also, according to the second embodiment of the present invention, an inner circumference of an area of the second sealing part 420, which is provided above the lower end of the circumference of the cup P, may also be formed in a straight-line shape.

Alternatively, as illustrated in FIG. 6, according to the third embodiment of the present invention, an inner circumference of an area (i.e., an area existing within a section D1 of FIG. 6) of the first sealing part 410, which is provided below the upper end of the circumference of the cup P, may have both straight-line and curved shapes. Also, according to the third embodiment of the present invention, an inner circumference of an area of the second sealing part 420, which is provided above the lower end of the circumference of the cup P, may also have both straight-line and curved shapes.

Here, according to the second and third embodiments of the present invention, each of the curves formed on the inner circumferences of the first sealing part 410 and the second sealing part 420 may be formed to be concave when viewed from the electrode assembly 100 (see FIG. 4). However, the curve may be formed to be convex when viewed from the electrode assembly 100 (see FIG. 6).

According to a modified example of the present invention, one end of the first sealing part 410 may be formed below the upper end of the circumference of the electrode assembly 100. Also, according to a modified example of the present invention, one end of the first sealing part 420 may be formed above the lower end of the circumference of the electrode assembly 100.

More preferably, according to the modified examples of the present invention, one end of the left end and the right end of the first sealing part 410, which is provided to be adjacent to the folding part F, may be formed below the upper end of the circumference of the electrode assembly 100, and one end of the left end and the right end of the second sealing part 420, which is provided to be adjacent to the folding part F, may be formed above the lower end of the circumference of the electrode assembly 100.

Since the electrode assembly 100 is accommodated in the cup P, the circumference of the electrode assembly may also be disposed inside the cup P. Thus, when one end of the first sealing part 410 and one end of the second sealing part 420 are formed according to the modified examples of the present invention, the one end of the first sealing part and the one end of the second sealing part may be formed to be longer to effectively prevent the cracks from occurring in the exterior in the vicinity of the electrode assembly.

In the secondary battery 10 according to the present invention, the third sealing part 430 may be bent in a direction of a thickness t (see FIG. 3) of the electrode assembly 100. In this case, a volume occupied by the third sealing part 430 may be reduced to improve capacity per unit volume of the secondary battery.

The battery pack according to the present invention may include a plurality of secondary batteries 10. The content with respect to the secondary battery 10 are substituted with the above contents.

Method for Manufacturing Pouch Type Secondary Battery

Referring to FIGS. 2 to 7, a method for manufacturing a pouch type secondary battery according to the present invention may include a step of preparing an electrode assembly 100 having a structure, in which electrodes and a separator are alternately disposed, and a pouch type exterior 200, in which a cup P having a recessed shape is formed, a step of accommodating the electrode assembly 100 in the cup P, a step of folding the exterior 200 so that one area 210 and the other area 220 of the exterior 200 face each other, a step of disposing a first electrode lead 310 protruding outward through an upper circumference of the exterior 200 and a second electrode lead 320 protruding outward through a lower circumference of the exterior 200, and a step of forming a first sealing part 410 on the exterior 200 to cover the first electrode lead 310 and forming a second sealing part 420 on the exterior 200 to cover the second electrode lead 320.

Here, in the step of forming the first sealing part 410 and the second sealing part 420, one end of the first sealing part 410 may be sealed to be formed below the upper end of the circumference of the cup P, and one end of the second sealing part 420 may be sealed to be formed above the lower end of the circumference of the cup P. Here, as described above, the one end of the first sealing part 410 may be an end of the left end and the right end of the first sealing part 410, which is provided to be adjacent to the folding part F, and the one end of the second sealing part 420 may be an end of the left end and the right end of the second sealing part 420, which is provided to be adjacent to the folding part F.

The process of forming the first sealing part 410 may be, more specifically, a process of performing sealing in two stages. The two-stage sealing may mean a normal lead sealing process and an additional sealing process.

FIG. 8 is a plan view illustrating a state in which the first sealing part 410 is formed through the normal lead sealing process and the additional sealing process.

Referring to FIG. 8, the normal lead sealing process may mean a process of sealing an area of a sealing part, which is disposed above an upper end TE of a circumference P-1 of a cup, through a sealing tool so that a first area 210 and a second area 220 of the pouch cover a first electrode lead 310. As a result, the normal lead sealing area S1 may be formed.

Also, the additional lead sealing process may mean a process of sealing an area of the sealing part, which is disposed below the upper end TE of the circumference P-1 of the cup, through the sealing tool so that the first area 210 and the second area 220 of the pouch are bonded to each other. As a result, the additional lead sealing area S2 may be formed.

Here, the area of the first sealing part 410, which is formed by being sealed below the upper end TE of the circumference P-1 of the cup through the additional sealing process, may have a length d of 0 mm to 10 mm. The meaning of 0 mm to 10 mm may mean more than 0 mm and not more than less than 10 mm. If the length d is 0 mm, an effect of the present invention of preventing the cracks from occurring in the pouch near the sealing part may not be effectively expressed. If the length d exceeds 10 mm, the additionally sealed portion may be inserted too deeply toward the electrode assembly 100 so that the space in which the electrode assembly 100 is accommodated is narrow or tight.

In the method for manufacturing the pouch type secondary battery according to the present invention, each of the normal lead sealing area S1 and the additional sealing area S2 may have different sealing thicknesses for each section. For example, referring to FIG. 8, the sealing thickness may be different in a section a-b and a section b-c of FIG. 8. The section a-b may represent a general pouch-pouch sealing thickness (reference sealing thickness), and the section b-c may have a thickness greater or less than that of the section a-b. Also, the sealing thickness may be constant or variable even within one section. That is, the sealing thickness may be constant within one section a-b, but the present invention is not limited thereto, and the sealing thickness may constantly increase or decrease in the section a-b. Furthermore, the sealing thickness may be irregularly changed even within one section. Also, the above description may be applied even within one section b-c.

When the sealing form is implemented in such various forms, since an optimal sealing part for preventing the pouch cracks from occurring is configured in accordance with a case in which a size, shape, type, material, thickness, etc. of the pouch vary, an excellent secondary battery in which the prevention of occurrence of the pouch cracks, which is an inherent effect of the present invention, is maximized for each pouch type may be manufactured.

In addition, the method for manufacturing the pouch type secondary battery according to the present invention may further include a step of forming a third sealing part 430 formed along a circumference of the electrode assembly 100 to connect the first sealing part 410 to the second sealing part 420. The third sealing part 430 may be formed after forming the first sealing part 410 and the second sealing part 420 (however, if one sealing tool is used as described above, the third sealing part 430, the first sealing part 410, and the second sealing part 420 may be formed at the same time). Here, one end of the third sealing part 430 may be connected to the first sealing part 410, and the other end of the third sealing part 430 may be connected to the second sealing part 420.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Secondary battery
100: Electrode assembly
200: Exterior

210: First area
220: Second area
300; Electrode lead
310: First electrode lead
320: Second electrode lead
400: Sealing part
410: First sealing part
410-1: One end of first sealing part
420: Second sealing part
430: Third sealing part
P: Cup
R: Boundary of cup
F: Folding part
S1: Normal lead sealing area
S2: Additional sealing area
P-1: Circumference of cup
TE: Upper end

The invention claimed is:

1. A pouch type secondary battery comprising:
an electrode assembly having a structure in which electrodes and a separator are alternately disposed;
a pouch type exterior in which a cup having a shape recessed to accommodate the electrode assembly is formed, the pouch type exterior comprising a first area and a second area, a folding part is formed at a boundary between the first area and the second area so that the first area is folded with respect to the second area, and the first area and the second area face each other; and
at least one electrode lead electrically connected to the electrode assembly and protruding outward through a periphery of the pouch type exterior,
wherein a sealing part is formed on the pouch type exterior along a periphery of the electrode assembly,
the at least one electrode lead comprises a first electrode lead protruding outward through an upper periphery of the pouch type exterior and a second electrode lead protruding outward through a lower periphery of the pouch type exterior,
the sealing part comprises a first sealing part covering the first electrode lead and a second sealing part covering the second electrode lead, and
at least one of a left end or a right end of the first sealing part adjacent to the folding part is formed below an upper end of a periphery of the electrode assembly, and at least one of a left end or a right end of the second sealing part adjacent to the folding part is formed above a lower end of the periphery of the electrode assembly.

2. The pouch type secondary battery of claim 1, wherein both of the left end and the right end of the first sealing part are formed below the upper end of the periphery of the cup.

3. The pouch type secondary battery of claim 1, wherein both of the left end and the right end of the second sealing part are formed above the lower end of the periphery of the cup.

4. The pouch type secondary battery of claim 1, wherein an area of the first sealing part that is sealed below the upper end of the periphery of the cup has a length of more than 0 mm and not more than 10 mm.

5. The pouch type secondary battery of claim 1, wherein an inner edge of an area of the first sealing part that is sealed below the upper end of the circumference of the cup has a straight-line shape.

6. The pouch type secondary battery of claim 1, wherein an inner edge of an area of the first sealing part that is sealed below the upper end of the circumference of the cup has a curved shape.

7. The pouch type secondary battery of claim 6, wherein the curved shape is concave when viewed in a direction extending away from the electrode assembly.

8. The pouch type secondary battery of claim 6, wherein the curved shape is convex when viewed in a direction extending away from the electrode assembly.

9. The pouch type secondary battery of claim 1, wherein an inner edge of an area of the first sealing part that is sealed below the upper end of the circumference of the cup has a first portion having a straight-line shape and a second portion having a curved shape.

10. The pouch type secondary battery of claim 1, wherein the sealing part further comprises a third sealing part connecting the first sealing part to the second sealing part.

11. The pouch type secondary battery of claim 10, wherein the third sealing part is bent in a direction of a thickness of the electrode assembly.

12. The pouch type secondary battery of claim 1, wherein the at least one of the left end or the right end of the second sealing part is formed above a lower end of a periphery of the electrode assembly.

13. A method for manufacturing a pouch type secondary battery, the method comprising:
preparing an electrode assembly having a structure in which electrodes and a separator are alternately disposed, and preparing a pouch type exterior in which a cup having a recessed shape is formed;
placing the electrode assembly in the cup;
folding the pouch type exterior to form a folding part in which a first area and a second area of the pouch type exterior face each other;
positioning a first electrode lead protruding outward through an upper periphery of the pouch type exterior and a positioning second electrode lead protruding outward through a lower periphery of the pouch type exterior;
forming a first sealing part of the pouch type exterior to cover a portion of the first electrode lead; and
forming a second sealing part of the pouch type exterior to cover a portion of the second electrode lead,
wherein, during the forming of the first sealing part, at least one of a left end or a right end of the first sealing part adjacent to the folding part is formed below an upper end of a periphery of the electrode assembly, and at least one of a left end or a right end of the second sealing part adjacent to the folding part is formed above a lower end of the periphery of the electrode assembly.

14. The method of claim 13, wherein the forming of the first sealing part comprises a two-stage sealing process comprising a normal lead sealing process and an additional sealing process.

15. The method of claim 14, wherein the normal lead sealing process is a process of sealing an area of the first sealing part that is disposed above the upper end of the periphery of the cup, using a sealing tool so that a first area and a second area of the pouch type exterior covers the portion of the first electrode lead to form a normal lead sealing area, and
the additional lead sealing process is a process of sealing an area of the first sealing part that is disposed below the upper end of the periphery of the cup using the sealing tool so that the first area and the second area of the pouch type exterior are bonded to each other to form an additional sealing area.

16. The method of claim 15, wherein the normal lead sealing area and the additional sealing area have different sealing thicknesses.

\* \* \* \* \*